United States Patent
Milano et al.

(10) Patent No.: US 12,513,094 B2
(45) Date of Patent: Dec. 30, 2025

(54) MANAGING BANDWIDTH USAGE IN DISCONNECTED, INTERMITTENT, AND LOW BANDWIDTH (DIL) NETWORKS

(71) Applicant: CodeMettle, LLC, Atlanta, GA (US)

(72) Inventors: James R. Milano, Atlanta, GA (US); Jonathan Tyler Drews, Atlanta, GA (US)

(73) Assignee: CodeMettle, LLC, Atlanta, GA (US)

( * ) Notice: Subject to any disclaimer, the term of this patent is extended or adjusted under 35 U.S.C. 154(b) by 260 days.

(21) Appl. No.: 18/158,526

(22) Filed: Jan. 24, 2023

(65) Prior Publication Data

US 2024/0250917 A1    Jul. 25, 2024

(51) Int. Cl.
    *H04L 47/783*    (2022.01)
    *H04L 12/28*     (2006.01)
    *H04L 47/80*     (2022.01)

(52) U.S. Cl.
    CPC .......... *H04L 47/783* (2013.01); *H04L 47/805* (2013.01); *H04L 12/2854* (2013.01)

(58) Field of Classification Search
    CPC .... H04L 47/783; H04L 1/1887; H04W 72/56; H04W 72/1242
    See application file for complete search history.

(56) References Cited

U.S. PATENT DOCUMENTS

| | | | |
|---|---|---|---|
| 6,816,903 B1* | 11/2004 | Rakoshitz | H04L 47/10 709/229 |
| 10,271,261 B1* | 4/2019 | Lindsley | H04W 40/14 |
| 2007/0297416 A1* | 12/2007 | Boley | H04L 47/2416 370/395.21 |
| 2008/0025334 A1* | 1/2008 | Smith | H04L 1/1887 370/235 |
| 2012/0011252 A1* | 1/2012 | Alperovitch | H04L 47/2458 709/224 |
| 2016/0095132 A1* | 3/2016 | Hodroj | H04L 47/2433 370/235 |
| 2022/0005559 A1* | 1/2022 | Burton | G16H 10/60 |
| 2023/0081455 A1* | 3/2023 | Myneni | H04W 72/56 370/329 |

* cited by examiner

Primary Examiner — Caroline H Jahnige
(74) Attorney, Agent, or Firm — Blank Rome LLP (57) ABSTRACT

A bandwidth management system for nodes in a network hierarchy that enables network operators to monitor/control bandwidth allocated for various types of data using existing quality of service (QOS) priorities. In various embodiments, the system may store lower priority data in a mutable queue and drop/overwrite untransmitted data (e.g., after a certain time period, upon receipt of updated data, etc.), select the wide area network best suited to transmit each type of data, change the QoS value of certain data types, and/or dynamically adjust the data prioritization or network selection based on the current mission or phase. In various embodiments, the system may also receive bulk data and distribute it locally to multiple devices, monitor the availability of each node and find the best path around unavailable nodes, and/or cache data output by a transmitting node and forward the cached data when a path to a destination node is available.

20 Claims, 10 Drawing Sheets

MANAGING BANDWIDTH USAGE IN DISCONNECTED, INTERMITTENT, AND LOW BANDWIDTH (DIL) NETWORKS

CROSS-REFERENCE TO RELATED APPLICATIONS

None

BACKGROUND

In certain networks, nodes are arranged in a network hierarchy and configured to communicate via wide area network(s) that are often disconnected, intermittent, and/or low bandwidth (DIL). Nodes in a DIL environment often suffer network delays (e.g., due to latency, jitter, packet loss, etc.). Meanwhile, nodes (particularly in a Department of Defense network) may shut off (e.g., for weeks at a time), preventing other nodes from communicating via the network hierarchy via that unavailable node.

Because nodes often seek to transmit more data than the total bandwidth capacity of all of the available wide area networks, nodes often employ class of service (CoS) profiles to prioritize and control network traffic to ensure the performance of critical applications. Packets sent from each node are identified (using access control lists, based on application type, based on switch port, etc.) and marked with QoS values (e.g., at the layer 3 IP header), which are interpreted by a router at the local network boundary to prioritize higher-priority data.

Even with the quality of service in place, however, important traffic exceeding the allocated bandwidth may be dropped while available bandwidth is reserved for other, lower priority data. Meanwhile, network operators and administrators may not have a clear picture of what is being sent over the wide area networks (particularly the data marked with the same QoS value). Accordingly, there is a need to provide functionality for network operators and administrators to monitor and control the bandwidth allocated for different types of data. However, because the quality of service at each node needs to be consistent across the entire network hierarchy (to avoid asymmetric behavior causing network failures and outages), network operators rarely change the quality of service once it is implemented. Furthermore, network operators and administrators may wish to dynamically adjust the prioritization of certain types of data, for example to prioritize mission-critical data during a scheduled mission.

Additionally, bandwidth is often used to transmit redundant data (e.g., multiple copies of the same software update for multiple devices at the node) or retransmit data (e.g., repeated attempts to transmit data via an unavailable path through the network hierarchy). Additionally, bandwidth is often used to send data that may be stored locally and transferred later. On the other hand, bandwidth is often used to transmit lower priority data that has been stored for so long that it is no longer relevant (e.g., previously received status or state data after the receipt of updated status or state data). Accordingly, there is a need to mitigate bandwidth usage in a DIL environment.

Additionally, nodes in a DIL environment indiscriminately utilize whichever wide area networks are prioritized and available, even if different wide area networks have their own advantages and disadvantages in terms of bandwidth, availability (e.g., intermittent availability or disruptions), or quality (high latency, high jitter, and/or high packet loss) and certain types of data are more or less susceptible to those specific networking conditions. Accordingly, there is a need to transmit various types of data using the wide area network best suited to transmit those types of data. Furthermore, because the availability, quality, and preferability of wide area networks may vary in ways that are predictable, network operators and administrators may wish to dynamically adjust selection of certain wide area networks.

SUMMARY

Disclosed is a system that manages bandwidth used to transmit data from a node via wide area network(s) by providing functionality for network operators to monitor and control the bandwidth allocated for each of a number of types of data (e.g., network operations data and/or user application data). Additionally, in some embodiments, the system mitigates bandwidth usage by storing lower priority data types in a mutable queue and dropping or overwriting data that has yet to be transmitted after a predetermined time period, upon receipt of updated data, etc. Additionally, in some embodiments, the system further reduces bandwidth usage by receiving bulk data and locally distributing a copy of that bulk data to multiple user devices via a local area network.

Additionally, in some embodiments, system selects the available wide area network that is best suited to transmit each type of data so that the limited bandwidth available is allocated in such a way that certain networking issues (e.g., packet loss, latency, etc.) are only borne by applications and data that are less susceptible to those networking issues. Additionally, in some embodiments, system enables the network operators to prioritize certain types of data using existing quality of service (QOS) priorities, eliminating the need to change the simultaneously and uniformly reconfigure each router across the entire network architecture to avoid asymmetric behavior and network failures.

Additionally, in some embodiments, the system provides functionality to dynamically adjust that prioritization of and/or the selection of certain wide area networks, for example based on the current mission of the node or phase of war. Accordingly, the system preemptively addresses predictable issues in the availability and quality of the wide area networks and allocates the limited bandwidth that is available to data that is mission critical at that particular time.

Additionally, in some embodiments, the system reduces bandwidth consumption and improves reliability by configuring intermediate nodes in a network hierarchy to store data intended for transmission to via an unavailable path and forward that data when the path to the destination node becomes available.

Additionally, in some embodiments, the system monitors the availability of each node and enables each node to find the best path for transmitting data to other nodes and/or network operations centers even when an intermediate node is unavailable.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

Figure 1:
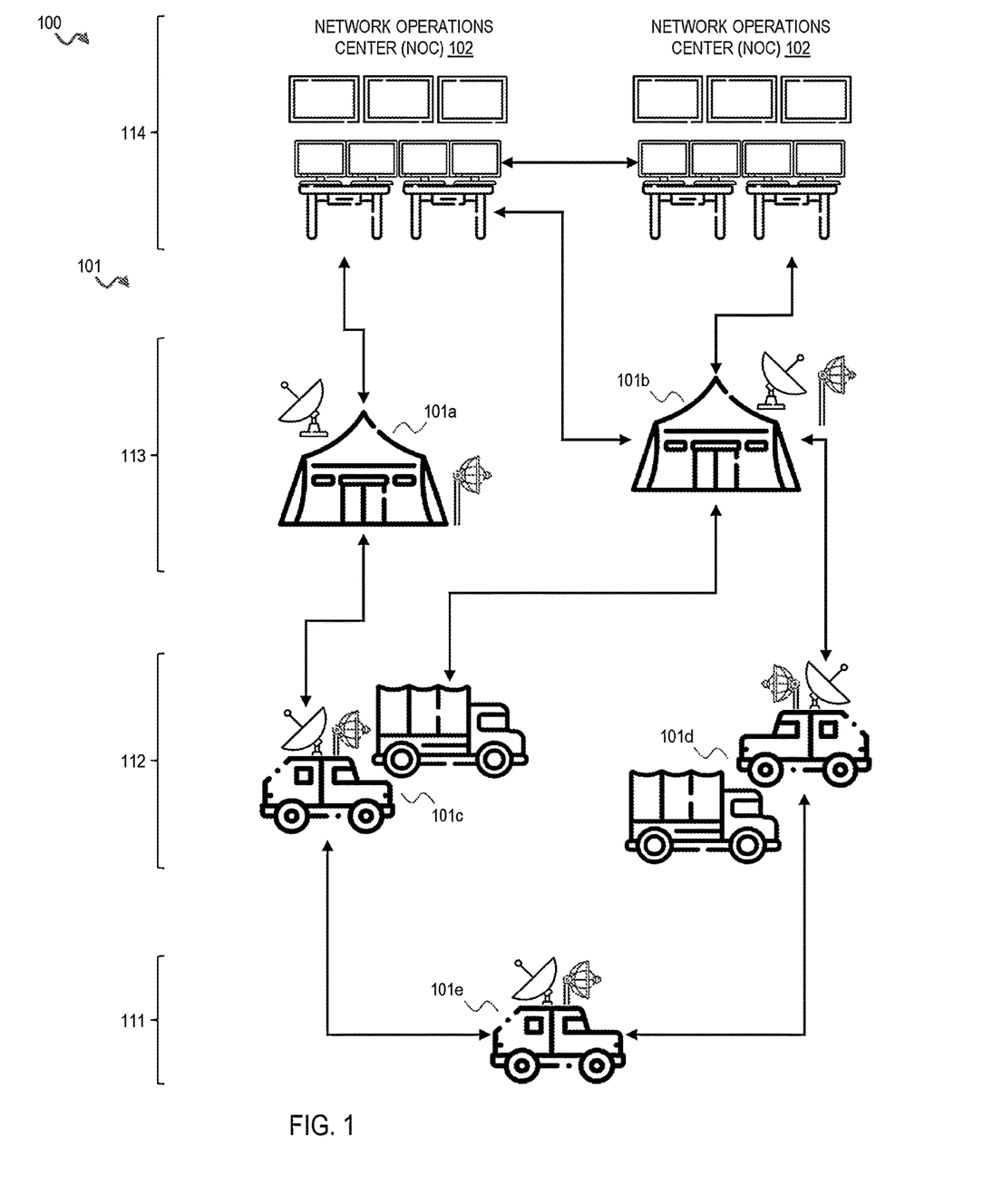
FIG. 1 is a diagram of an example architecture of a bandwidth management and mitigation system according to an exemplary embodiment.

FIG. 1 is a diagram of an example architecture 100 of the disclosed system 400. In the embodiment of FIG. 1, the architecture 100 includes a number of nodes 101 in bilateral communication with one or more network operations centers (NOCs) 102. While five nodes 101a through 101e and two network operation centers 102 are shown in FIG. 1, the architecture 100 may include any number of nodes 101 and network operation centers 102. In the embodiment of FIG. 1, nodes 101 and network operations centers 102 are arranged in a hierarchical tree structure to provide communications for a child node 111, a parent node 112, a grandparent node 113, and a great grandparent node 114. In other embodiments, however, the nodes 101 and network operations center(s) 102 may have other arrangements. The architecture 100 may be, for example, a U.S. Department of Defense (DoD) network. However, the system described below is not so limited and, instead, many aspects of the disclosed system are similarly applicable to other architectures 100 (particularly those utilizing wide area network(s) 260 that are often disconnected, intermittent, and/or low bandwidth).

Figure 2:
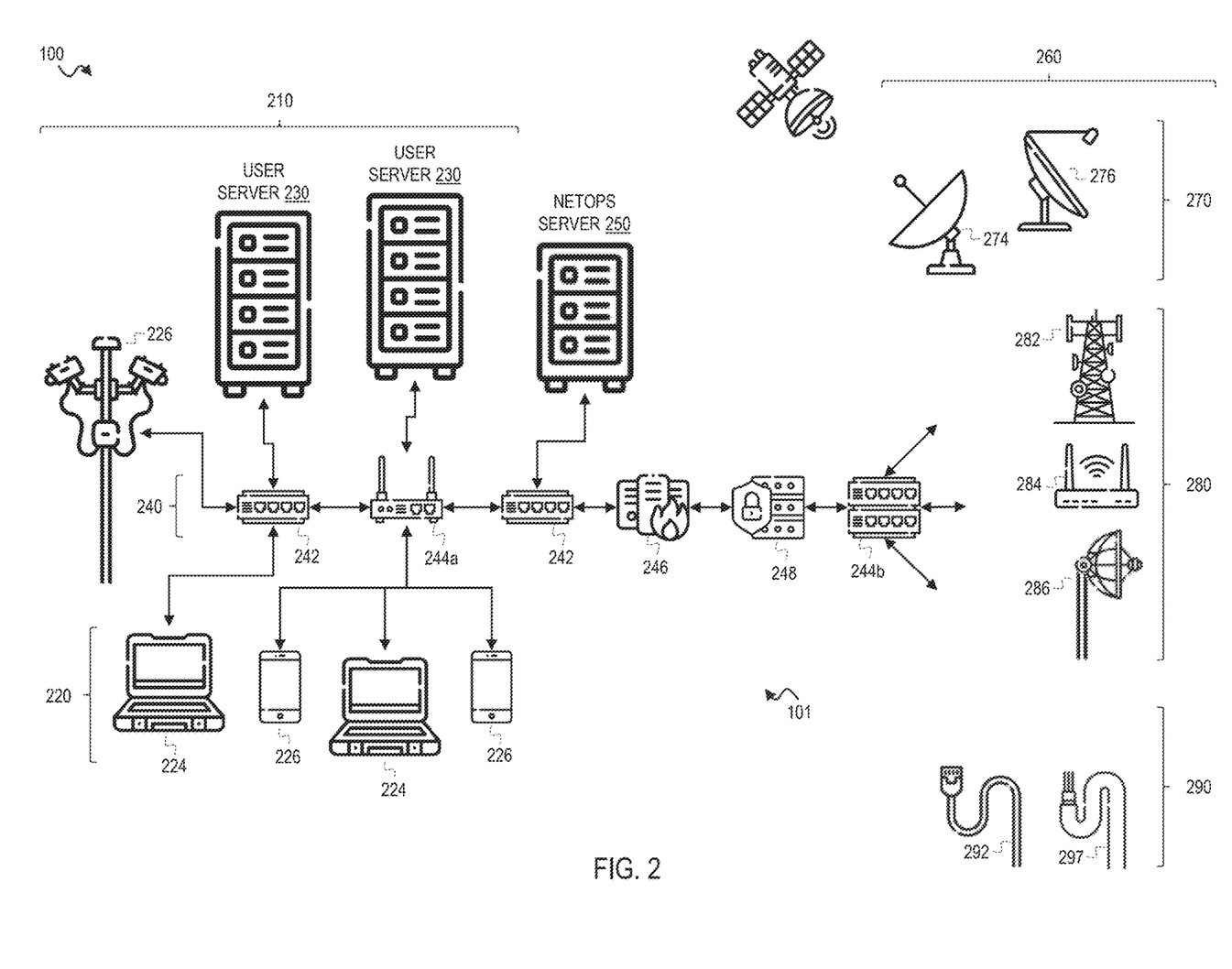
FIG. 2 is a diagram of the architecture of a single node according to an exemplary embodiment.

FIG. 2 is a diagram of the architecture 100 of a single node 101 according to an exemplary embodiment.

In the embodiment of FIG. 2, the node 101 includes user devices 210 in communication with a network operations (NetOps) server 250 via a local area network (LAN) 240. The user devices 210 and network operations server 250 are also in communication with the other nodes 101 and the network operations centers 102 via the local area network 240 and one or more wide area networks (WANs) 260. The user devices 210 may include end user devices 220, sensors 226, user servers 230, etc. The end user devices 220 may include personal computers 224, smartphones 226, etc. The wide area network(s) 260 may include any wired or wireless communication network, including beyond line-of-sight (BLOS) communication networks 270, line-of-sight communication (LOS) networks 280, and wired communication networks 290. The beyond line-of-sight communication networks 270 may include, for example, satellite communication networks 270 (e.g., the Wideband Global SATCOM system, the Defense Satellite Communications System, commercial satellite networks such as Space X StarLink, etc.), tropospheric scatter communication 276, etc. The line-of-sight communication networks 280 may include cellular networks 282, wireless fidelity (WiFi) networks 284, microwave transmission 286, etc. The wired communication networks 290 may include, for example, ethernet communications 292, fiber optic communications 297, etc.

To facilitate communication within the node 101, the local area network 240 may include one or more switches 242 and/or routers 244 (e.g., router 244a as shown in FIG. 2). To facilitate communication to and from the node 101, the local area network 240 may include one or more firewalls 246, one or more encryptors 248, and one or more routers 244 at the local network boundary (e.g., the router 244b as shown in FIG. 2) for selecting one of the wide area network(s) 260. The router(s) 244, the firewall(s) 246, and/or the encryptor(s) 248 may be hardware devices or virtual router (s) 244, virtual firewall(s) 246, and/or software software-based encryptor(s) 248 (e.g., executed by one or more user servers 230).

Figure 3:
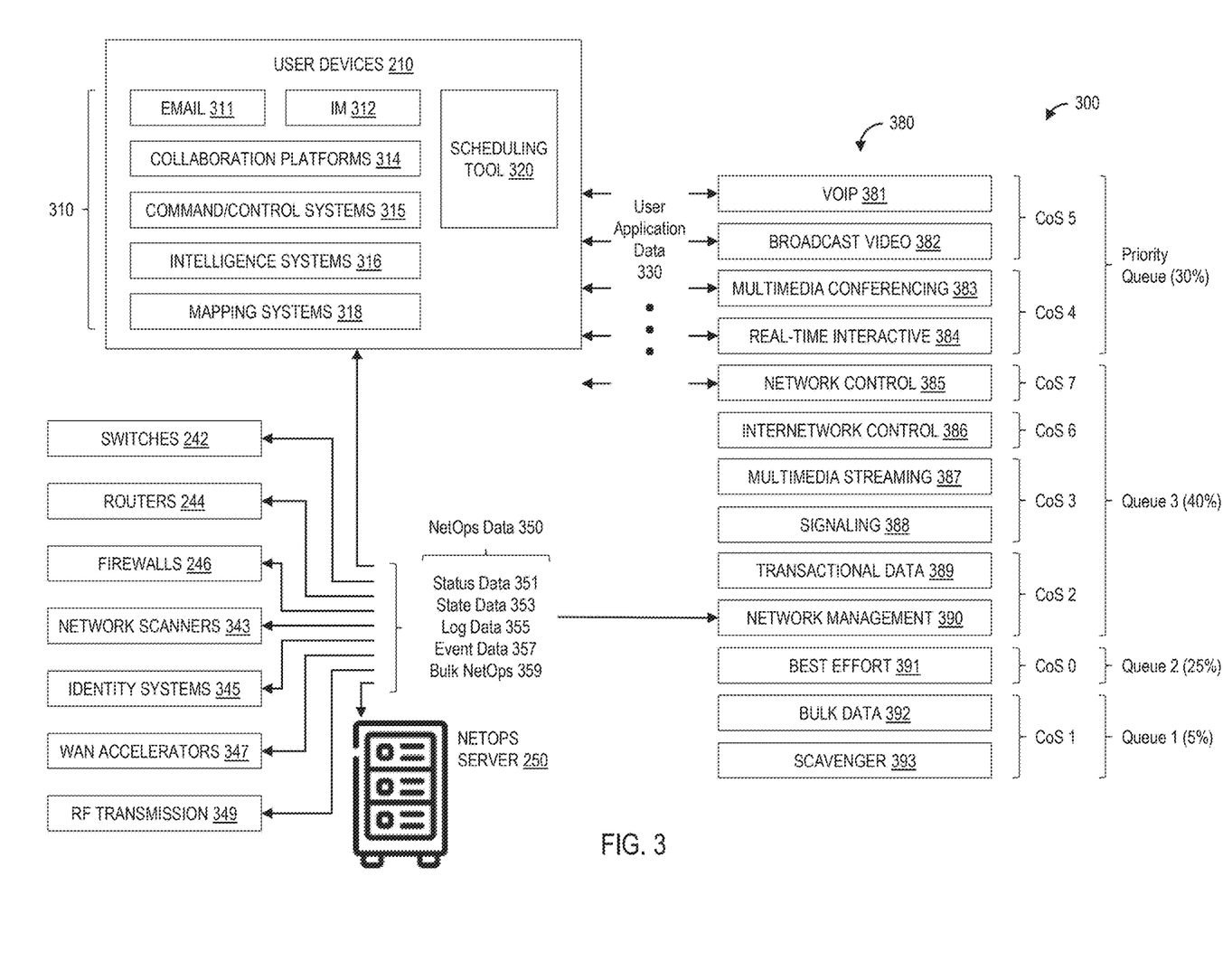
FIG. 3 illustrates user application data, network operations (NetOps) data, and an example quality of service according to an exemplary embodiment.

FIG. 3 illustrates user application data 330, network operations (NetOps) data 350, and an example quality of service 300 according to an exemplary embodiment.

The user application data 330 includes data sent and received by the user devices 210 (e.g., end user devices 220, user servers 230, etc.), including voice-over-internet protocol (VOIP) streams 381, broadcast video 382, multimedia conferencing data 383, real-time interactive data 384, etc. The network operations data 350 includes data sent and received (e.g., to a network operations center 102 via the wide area network(s) 260) o to remotely monitor the health, performance, and security of computing devices at the node 101. For example, a firewall 246 may communicate with a remote firewall manager at a network operations center 102 that monitors the health, performance, and security of firewalls 246 at each node 101.

In the embodiment of FIG. 3, the network operations data 350 includes status data 351, state data 353, log data 355, event data 357, and bulk network operations data 359. The status data 351 includes information indicative of the current and/or past health, performance, and/or security of a computing component at the node 101 (e.g., current CPU usage, average usage of a CPU over the past hour, etc.) The state data 353 includes information indicative of the difference between the current and desired health, performance, and/or security of a computing component (e.g., a switch 242 has a firmware version that deviates from a desired firmware version). The log data 355 includes events, alarms, security logs, raw logs (e.g., syslog notification messages, NetFlow data, Windows event logs, etc.). The event data 357 includes notifications, generated by the network operations server 250 based on the log data 355 and/or other network operations data 350, indicating an event of interest to a user (e.g., an intrusion detection alarm generated in response to a security log from a router 244). The bulk network operations data 359 includes bulk data required by the node 101 (e.g., firmware updates, configurations files operating system updates, virtual machine images, geographic map files, etc.).

Network operations data 350 may be output via the wide area network(s) 260 by hardware computing devices and/or virtual machines (e.g., switches 242, routers 244, firewalls 246, network scanners 343, identity systems 345, WAN accelerators 347, RF transmission systems 349, etc.) and other as well as user applications 310 executed by the user devices 210 (e.g., email 311, instant messaging 312, collaboration platforms 314, command and control systems 315, intelligence systems 316, mapping systems 318, etc.).

The disclosed system is designed to operate in an architecture where the wide area networks 260 are often disconnected, intermittent, and/or low bandwidth (DIL). Nodes 101 often suffer network delays (e.g., due to latency, jitter, packet loss, etc.), particularly in DoD networks where nodes 101 are mobile. Meanwhile, the user devices 210 at each node 101 often seek to transmit more user application data 330—including mission-critical data—than the total bandwidth capacity of all of the available wide area network(s) 260. Accordingly, nodes 101 employ class of service (CoS) profiles to classify traffic streams and quality of service (QOS) values 380 to prioritize and control network traffic to ensure the performance of critical applications.

Traffic sent via the wide area network(s) 260 is marked with quality of service (QOS) values 380, which are interpreted by the router 244b at the local network boundary to prioritize higher-priority data. To mark traffic with the appropriate QoS value 380, packets may be identified and classified using access control lists (e.g., IP address, port, etc.) and/or based on application type (via network-based application recognition) and/or switch port. Packets may be marked with the identified QoS value 380 at the layer 3 IP header using the differentiated services code point (DSCP).

In the example QoS 300, 30 percent of the available bandwidth is reserved for a priority queue that includes VOIP streams 381 and broadcast video 382 (classified as CoS 5) as well as multimedia conferencing data 383 and real-time interactive data 384 (classified as CoS 4). Queue 3, which is limited to 40 percent of the available bandwidth, includes network control data 385 (classified as CoS 7), internetwork control data (classified as CoS 6), multimedia streaming data 387 and signaling data 388 (classified as CoS 3), and transactional data 389 and network management data 390 (classified as CoS 2). Queue 2, which is limited to 25 percent of the available bandwidth, is the non-prioritized bandwidth (referred to as "best effort" 391). Queue 1, which is limited to 5 percent of the available bandwidth, includes bulk data 392 and leftover prioritized bandwidth (referred to as "scavenger" 393).

Figure 4:
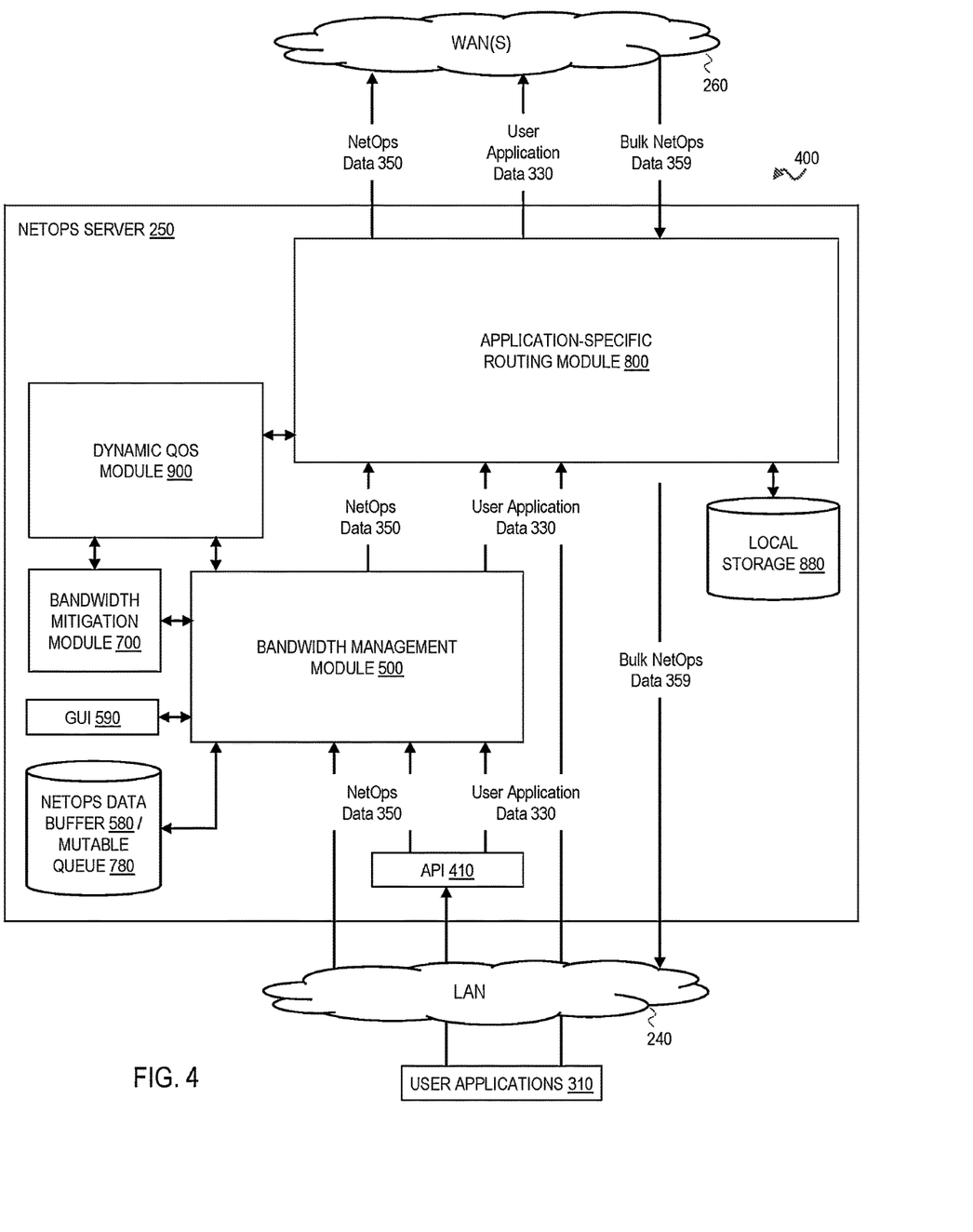
FIG. 4 is a block diagram illustrating the bandwidth management and mitigation system according to an exemplary embodiment.

FIG. 4 is a block diagram illustrating a bandwidth management and mitigation system 400 according to an exemplary embodiment.

As described in detail below with reference to FIGS. 5 and 6, in some embodiments the bandwidth management and mitigation system 400 includes a bandwidth management module 500 that includes a network operations data buffer 580 and a graphical user interface 590. As described below with reference to FIG. 7, in some of those embodiments the bandwidth management and mitigation system 400 also includes a bandwidth mitigation module 700 and the network operations data buffer 580 includes a mutable queue 780. As described below with reference to FIGS. 8A and 8B, in some embodiments the bandwidth management and mitigation system 400 includes an application-specific routing module 800 that includes local storage 880. As described below with reference to FIG. 9, in some embodiments the bandwidth management and mitigation system 400 includes a dynamic quality of service module 900. The bandwidth management module 500, the bandwidth mitigation module 700, the application-specific routing module 800, and the dynamic quality of service module 900 may be realized as software instructions stored (in non-transitory computer readable storage media) and executed (by one or more hardware computer processors) by the network operations server 250. The network operations data buffer 580 (e.g., mutable queue 780) and the local storage 880 are non-transitory computer readable storage media that may be internal to or accessible by the network operations server 250 (e.g., via one or more wired connections, wireless connections, or via the local area network 240). The graphical user interface 590 may be provided by the network operations server 250 and accessible to operators/administrators at the node 101 (via input/output devices such as a keyboard, mouse, and display and/or end user devices 220) and/or at one or more network operations centers 102.

By routing network operations data 350 and/or user application data 330 via the network operations server 250, the system 400 enables network operators to monitor and control allocated bandwidth. For example, as described below, the bandwidth management module 500 and the bandwidth mitigation module 700 enable network operators to monitor and control the bandwidth allocated for network operations data 350 output by the node 101 via wide area network(s) 260 (and, in some embodiments, user application data 330 received via an application programming interface 410). Additionally, in some embodiments, the application-specific routing module 800 enables the network operations server 250 to locally distribute bulk network operations data 359 received via wide area network(s) 260, reducing bandwidth usage by eliminating the need for multiple user devices 210 to individually receive that bulk network operations data 359.

Figure 8A:
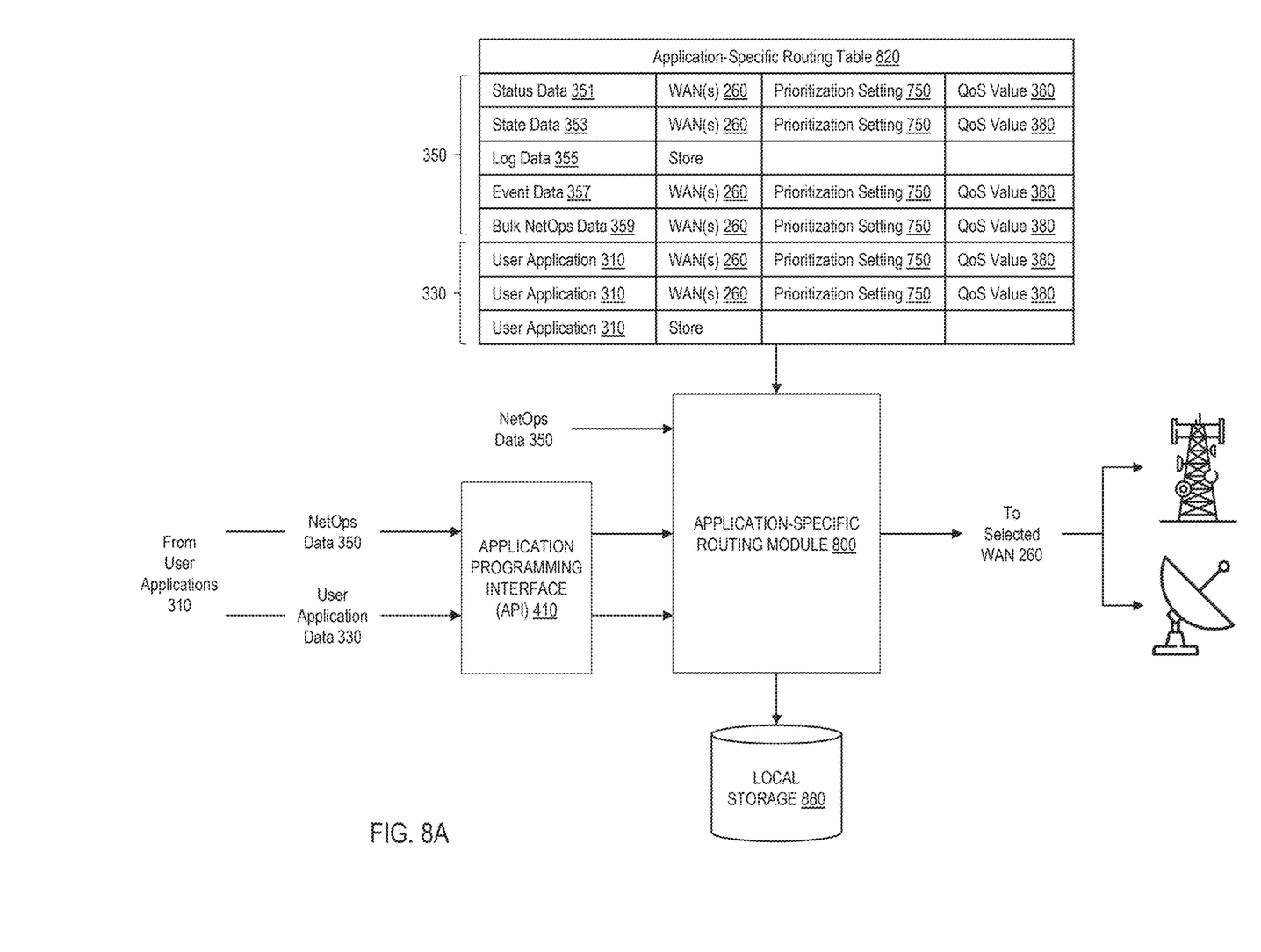
FIG. 8A is a block diagram illustrating an application-specific routing module according to an exemplary embodiment.

Additionally, in some embodiments, the application-specific routing module 800 selects the available wide area network 260 that is best suited to transmit each type of network operations data 350 and user application data 330 so that the limited bandwidth available is allocated in such a way that certain networking issues (e.g., packet loss, latency, etc.) are only borne by applications and data that are less susceptible to those networking issues. Additionally, in some embodiments, the application-specific routing module 800 enables the network operators to prioritize certain types of network operations data 350 and user application data 330. Critically, the application-specific routing module 800 funnels the network operations data 350 and user application data 330 through existing QoS 300 priorities, eliminating the need to change the QoS 300 at the node 101 and, by extension, the need to simultaneously and uniformly reconfigure each router 244 across the entire architecture 100 to avoid asymmetric behavior and network failures.

Figure 9:
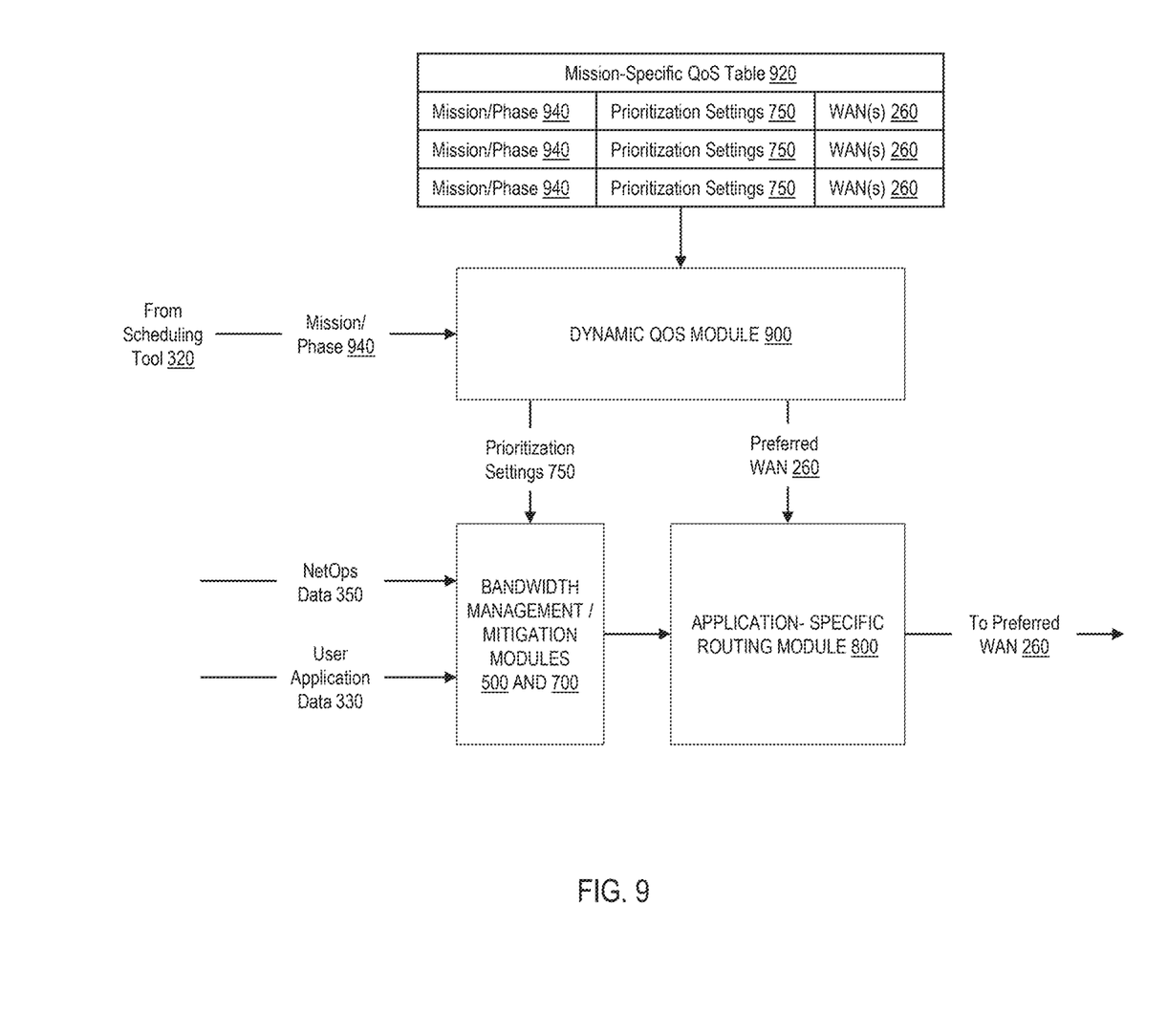
FIG. 9 is a block diagram illustrating a dynamic quality of service module according to an exemplary embodiment.

Additionally, in some embodiments, the dynamic quality of service module 900 dynamically adjusts the prioritization of those types of network operations data 350 and user application data 330 and/or the selection of certain wide area networks 260 (e.g., based on the current mission of the node 101 or a phase of war). Accordingly, the dynamic quality of service module 900 allows the system 400 to preemptively address predictable issues in the availability and quality of the wide area networks 260 and allocates the limited bandwidth that is available to data that is mission critical at that particular time.

Finally, in some embodiments, the system 400 monitors the availability of each node 101 and enables each node 101 to find the best path for transmitting data to other nodes 101 and/or network operations centers 102 (e.g., as shown in FIG. 1) even when an intermediate node 101 is unavailable.

Figure 5:
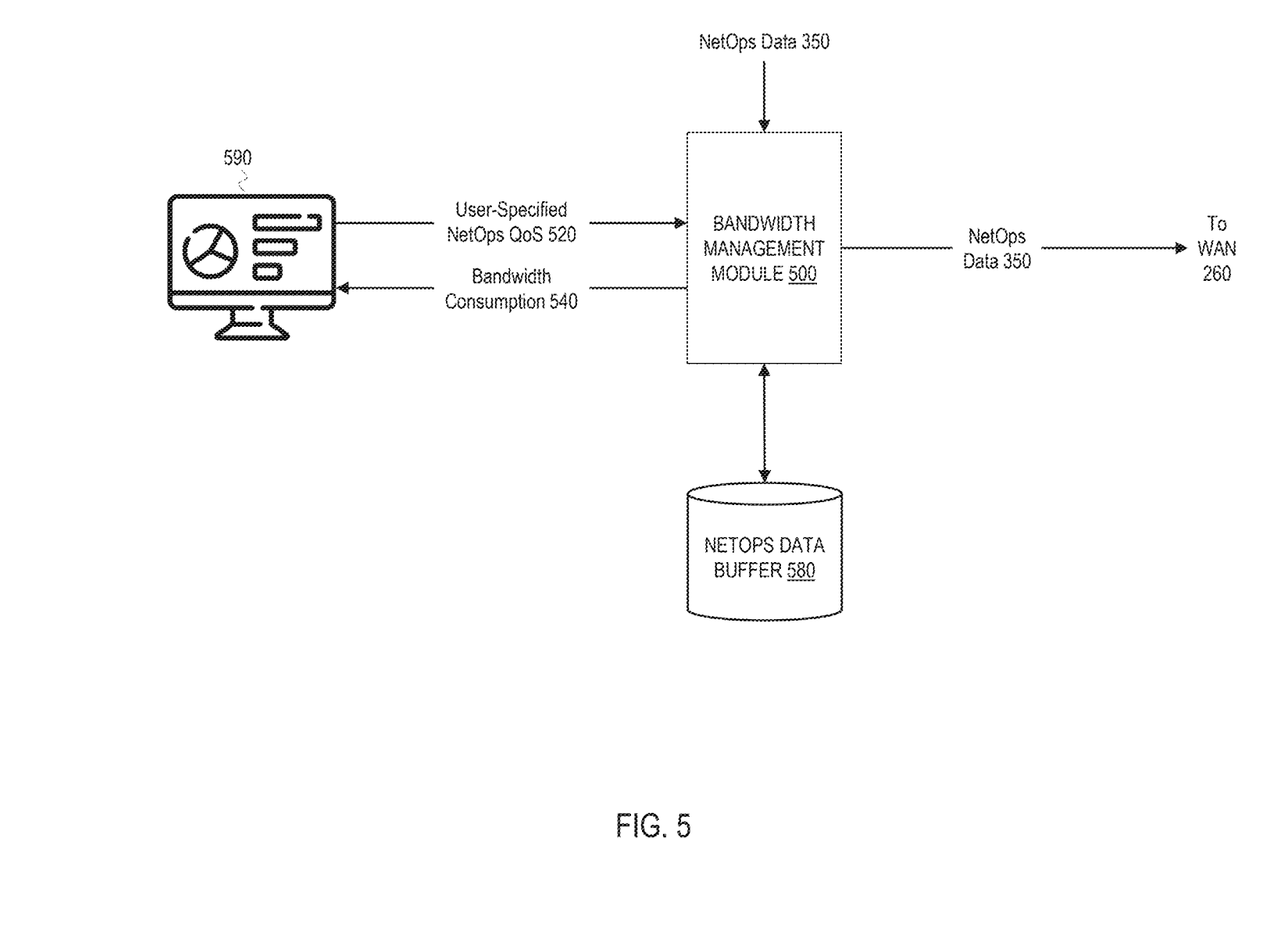
FIG. 5 is a block diagram of the bandwidth management module according to an exemplary embodiment.

FIG. 5 is a block diagram illustrating a bandwidth management module 500 according to an exemplary embodiment. FIG. 6 is a view of a graphical user interface 590 provided by the bandwidth management module 500 according to an exemplary embodiment.

As described above, the architecture 100 of disclosed system is complex, with nodes 101 transmitting many types of data, clouded by encryption, over many types of wide area networks 260 that are often disconnected, intermittent, low bandwidth, and/or high latency. Even with the quality of service 300 in place, important traffic (e.g., VOIP data 381, multimedia conferencing 383, real-time interactive data 384, etc.) exceeding the allocated bandwidth may be dropped while available bandwidth is reserved of non-critical network operations data 350.

One issue, in particular, is that all network operations data 350 is classified as network management data 390 (having a class of CoS 2) and given the same priority for bandwidth allocation purposes, regardless of whether that network operations data 350 is critical to the current mission or time sensitive. Meanwhile, operators and administrators do not have a clear picture of what network operations data 350 is being sent over the wide area networks 260 and when that network operations data 260 is being sent.

To overcome those drawbacks, the bandwidth management module 500 enables operators and administrators to control the bandwidth allocated for network operations data 350 and monitor the bandwidth used for network operations data 350. In particular, as described below with reference to FIG. 6, the bandwidth management module 500 differentiates between different types of network operations data 350, enabling operators and administrators to control the bandwidth allocated for different types of network operations data 350.

As shown in FIG. 5, the bandwidth management module 500 includes a user interface 590 and a network operations data buffer 580. The user interface 590 provides functionality for operators and administrators to specify a user-specified network operations data quality of service (NetOps QoS 520) to control the bandwidth used to the transmit network operations data 350. Additionally, the bandwidth management module 500 enables those operators and administrators to monitor the bandwidth used to the transmit network operations data 350 (the bandwidth consumption 540).

Figure 6:
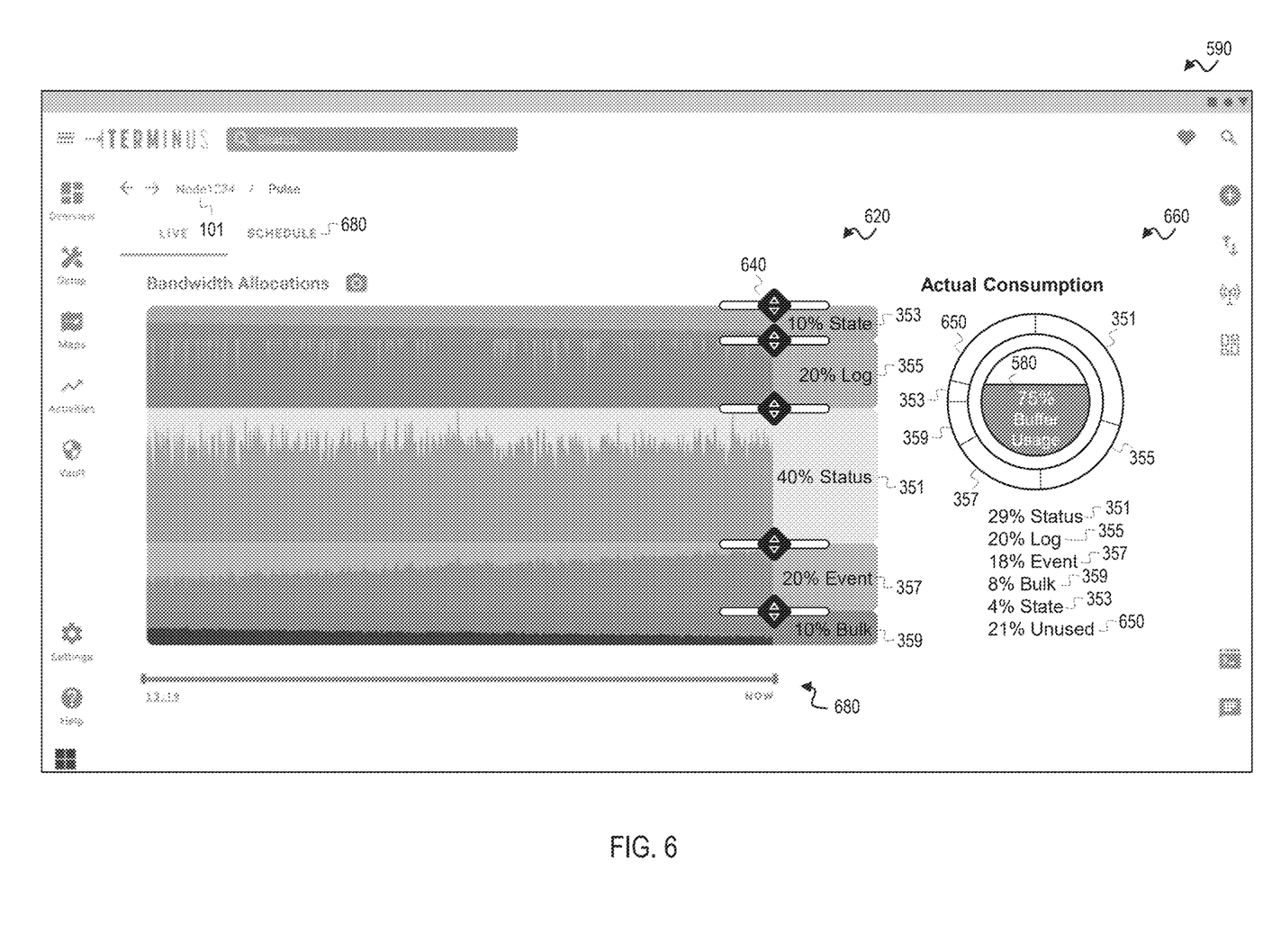
FIG. 6 is a view of a graphical user interface provided by the bandwidth management module according to an exemplary embodiment.

As shown in FIG. 6, for example, the bandwidth management module 500 provides functionality 620 for operators and administrators to limit the bandwidth allocated for each of a plurality of types of network operations data 350. In the example of FIG. 6, for instance, the user interface 590 includes sliders 640 enabling the user to specify the bandwidth (e.g., as a percentage of the total bandwidth allocated for network operations data 350) allocated for status data 351, state data 353, log data 355, event data 357, and bulk network operations data 359. Additional network operations data 350 exceeding the bandwidth allocation for that type is temporarily stored in the network operations data buffer 580. In addition to controlling the current bandwidth allocation for each type of network operations data 350, the user interface 590 also provides functionality 680 to schedule changes to those bandwidth allocations. Finally, the user interface 590 also provides functionality 660 for the user to view the current and past bandwidth consumption by each type of network operations data 350, the unused bandwidth 650, and usage of the network operations data buffer 580.

Figure 7:
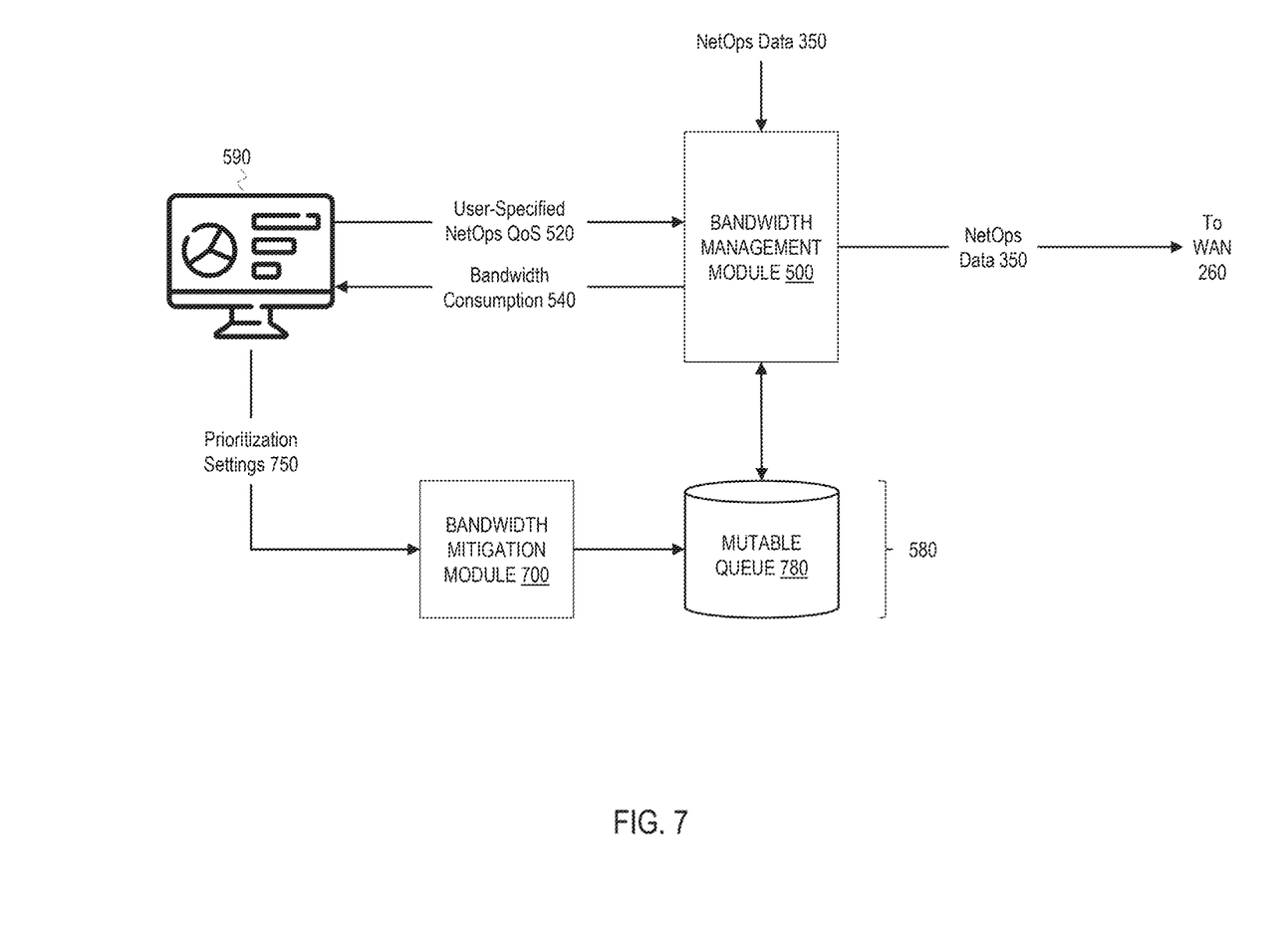
FIG. 7 is a block diagram illustrating a bandwidth mitigation module according to an exemplary embodiment.

FIG. 7 is a block diagram illustrating a bandwidth mitigation module 700 according to an exemplary embodiment.

As described above, the bandwidth management module 500 enables operators and administrators to effectively tailor the bandwidth usage of each type of network operations data 350 and includes a network operations data buffer 580 for temporarily storing network operations data 350 exceeding the bandwidth allocation for that type of network operations data 350. Additionally, in the embodiment of FIG. 7, a bandwidth mitigation module 700 provides functionality for operators and administrators to prioritize certain network operations data 350 (prioritization settings 750). For example, a user may classify certain network operations data 350 as having a higher priority, in which case that higher priority network operations data 350 may be transmitted as soon as bandwidth is available (e.g., the node 101 reconnects with a wide area network 280). By contract, the user may classify other network operations data 350 as having a lower priority. In that case, the lower priority network operations data 350 may be stored in the network operations data buffer 580 until after the higher priority network operations data 350 is transmitted.

Additionally, to reduce the total bandwidth used to transmit that network operations data 350, the network operations data 350 exceeding the bandwidth allocation for that type of network operations data 350 may be stored in a mutable queue 780 where lower priority network operations data 350 may be dropped (rather than being transmitted or stored) in response to certain conditions specified in the user prioritization settings 750. For example, the bandwidth mitigation module may provide functionality for the user to specify that certain lower priority network operations data 350 be dropped if it is not transmitted within a certain time period. In another example, a user may specify that lower priority network operations data 350 be dropped if updated data is received. For instance, the user may specify that previously received status data 351 or state data 353 be dropped if not transmitted before newer status data 341 or state data 343 is received.

While the bandwidth management module 500 and the bandwidth mitigation module 700 have been described above with reference to network operations data 350, the bandwidth management and mitigation modules 500 and 700 may also provide similar functionality for network operators to view, manage, and mitigate the bandwidth used to transmit user application data 330. As shown in FIG. 4, for example, user application data 330 may be received via the API 410, enabling the system 400 to identify both the source (i.e., the user application 310) and the content of the user application data 330. Accordingly, in those embodiments, the bandwidth management and mitigation modules 500 and 700 may provide functionality to prioritize and allocate bandwidth for different types of user application data 330.

Figure 8B:
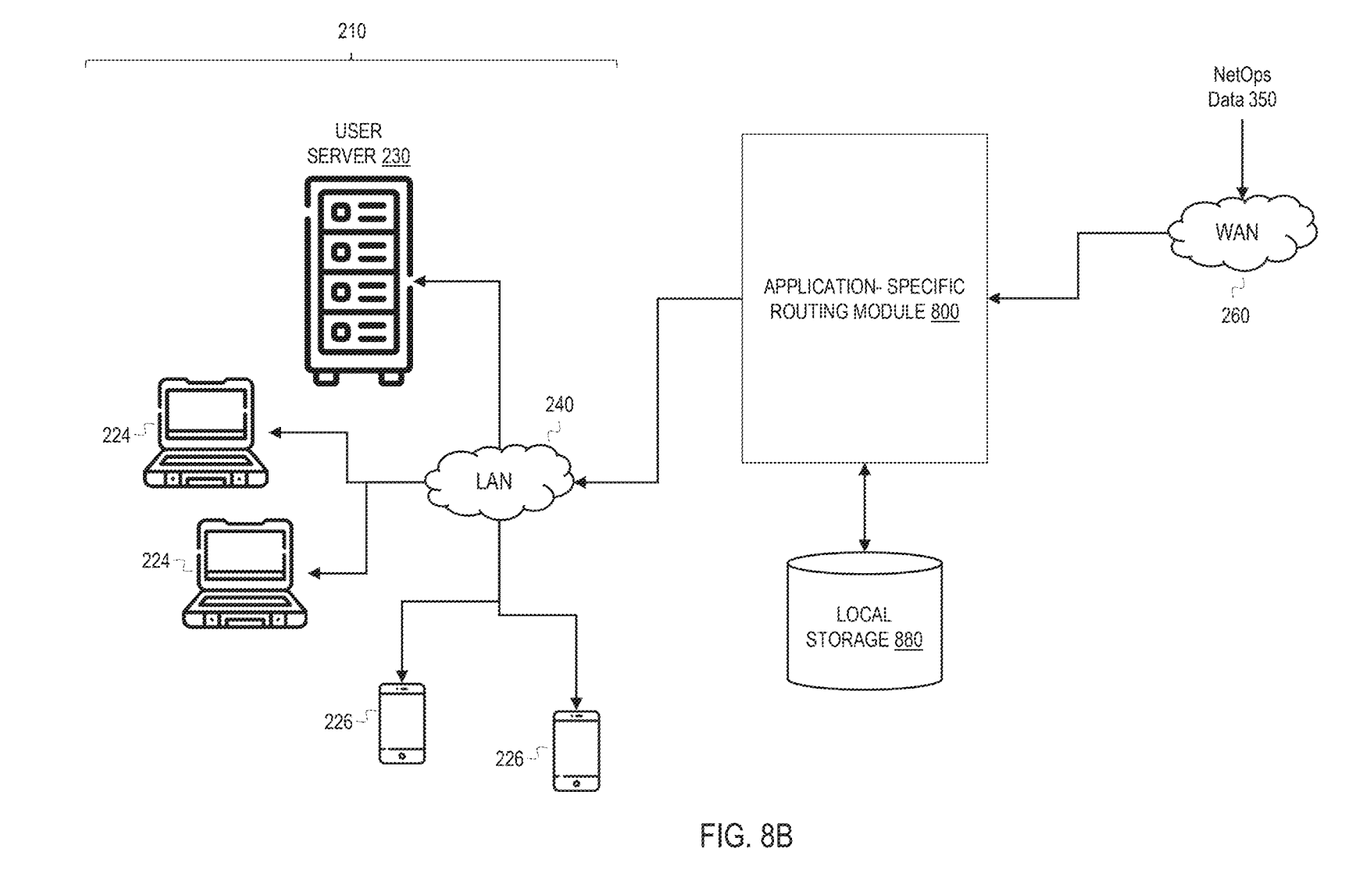
FIG. 8B is another block diagram illustrating the application-specific routing module of FIG. 8A according to an exemplary embodiment.

FIGS. 8A and 8B are block diagrams illustrating an application-specific routing module 800 according to exemplary embodiments.

While many of the wide area networks 260 in a DIL environment have at least one drawback in terms of availability (e.g., intermittent availability or disruptions), quality (high latency, high jitter, and/or high packet loss), or bandwidth, all of the wide area networks 260 in the DIL environment do not all suffer the same drawbacks to the same extent. Instead, each wide area network 260 has its own advantages and disadvantages relative to the other wide area networks 260 in the DIL environment in terms of in terms of bandwidth, latency, packet loss, etc. For example, BLOS communication networks 270 have high reliability and availability (except while on the move) relative to other wide area networks 260, but higher latency and lower bandwidth; LOS communication networks 280 have higher bandwidth and lower latency than other wide area networks 260, but lower reliability and availability; and wired communication networks 290 have higher bandwidth, reliability, and availability (and lower latency) than other wide area networks 260, but no ability to provide communications while on the move. Meanwhile, certain software applications may be more or less susceptible to certain networking conditions relative to other networking conditions. Therefore, some of the wide area networks 260 in the DIL environment may be better suited to transmit data from specific software applications relative to the other wide area networks 260 in the DIL environment. For instance, VOIP data 381 is more sensitive to latency and packet loss than software update packages included in bulk network operations data 359, but those software update packages require a lot of bandwidth. However, as described above, using current systems, nodes 101 indiscriminately utilize whichever wide area networks 260 are prioritized and available to transmit data regardless of the user application 310 outputting or receiving that data.

Accordingly, the embodiment of FIG. 8A includes an application-specific routing module 800 for routing network operations data 350 and/or user application data 330 from user applications 310 to selected wide area networks 260 associated with the type of network operations data 350 (e.g., status data 351, state data 353, etc.) or user application 310. As shown in FIG. 8A, the application-specific routing module 800 includes an application-specific routing table 820, which includes one or more wide area networks 260 associated with each of a plurality of types of network operations data 350 and/or each of a plurality of user applications 310. The application-specific routing module 800 is then able to route network operations data 350 and user application data 330 via the wide area networks 260, stored in the application-specific routing table 820, that are best suited to transmit each type of network operations data 350 and the user application data 330 data generated by each of the user applications 310.

For instance, the routers 244 may be modified to include multiple subnets representing each of the transmission systems 349 and wide area networks 260 available at each node 101. For example, if microwave transmission 286 and tropospheric scatter 276 is available from node 101e to node 101c, router 244 may be modified to include a subnet for microwave transmission 286 and a subnet for tropospheric scatter 276. Using those subnets, the system 400 may send bulk network operations data 359 through the subnet for microwave transmission 286 and send status data 351 and state data 353 through the subnet for tropospheric scatter 276. Alternatively, the routers 244 may be modified to include multiple tunnels representing each transmission system 349 and wide area network 260. In those embodiments, the system 400 may be provided with multiple IP addresses to tunnel traffic through specified transmission systems 349.

In some embodiments, the application-specific routing module 800 may also store data in local storage 880 so that it may be later transferred or summarized (rather than transmitted via one of the wide area networks 260). Accordingly, any network operations data 350 or user application data 330 being transmitted by the application-specific routing module 800 can instead be stored in the local storage 880 for long term storage or in response to short-term outages (e.g., poor network conditions, misconfigurations causing full outages, nodes 101 turned off overnight, etc.). Additionally, as described above with reference to FIG. 7, the system 400 provides functionality for network operators to decay packets over time (expiry), store packets for ensured delivery (given time range), and/or overwrite/supersede old untransmitted messages for new up to date messages (e.g., state data 353 or status data 351). Using the graphical user interface 590, the network operator may also, for example, set the bandwidth for one type of network operations data 350 (e.g., log data 355) to zero bandwidth for a period of time because other types of network operations 350 is higher priority. In that instance, the system 400 would buffer that bandwidth-limited data in the local storage 880 until the point in time where that data is provided bandwidth to transmit it to a NOC 102. Therefore, in addition to transmitting data using the wide area networks 260 that are best suited for each type of network operations data 350 and user application 310, the application-specific routing module 800 also reduces bandwidth usage, allowing that bandwidth to be used for mission-critical user applications 310.

Additionally, in some embodiments, the application-specific routing module 800 may provide functionality for network operators to prioritize certain network traffic within the existing QoS 300 of the node 101. For instance, the application-specific routing table 820 may store prioritization settings 750 for each type of network operations data 350 and each user application 310 (or type of user application data 330). As described above with reference to FIG. 7, those prioritization settings 750 may be used by the bandwidth management and mitigation modules 500 and 700 to prioritize the traffic with each QoS value 380 of the QoS 300. Additionally, in some embodiments, the application-specific routing module 800 may mark certain types of network traffic with a different QoS value 380 than was previously applied, enabling network operators to prioritize or deprioritize those types of traffic.

To make changes to the QoS 300 at the node 101, each router 244 across the entire architecture 100 must be simultaneously and uniformly reconfigured to avoid asymmetric behavior and network failures. However, because the system 400 funnels network traffic through the existing QoS 300 priorities as described above, the system 400 enables network operators to prioritize or deprioritize certain network traffic without the need to simultaneously and uniformly reconfigure each router 244 across the architecture.

As shown in FIG. 8B, in some embodiments the application-specific routing module 800 may further reduce bandwidth usage by receiving bulk network operations data 359 (e.g., from a network operations center 102) via a wide area network 260 and distributing that bulk network operations data 359 to multiple user devices 210 via the local area network 240. For instance, instead of using enough bandwidth for each computer 224 to each receive a copy of the same Windows update via the wide area networks 260, the application-specific routing module 800 may receive only one copy of that bulk network operations data 359, store that bulk network operations data 359 in the local storage 880, and distribute that bulk network operations data 359 locally to each user device 210 via the local area network 240.

In addition to saving bandwidth on the LAN 240 when distributing bulk network operations data 359 to multiple user devices 210, a similar process may be used to save bandwidth across one or more WANs 260 when distributing bulk data to multiple nodes 101 across the network hierarchy. Referring back briefly to FIG. 1, for example, to send software updates to node 101b, node 101c, and node 101d using conventional methods, a network operations center 102 would send three separate copies to node 101b: one copy for node 101b and two copies for distribution to node 101c and node 101d. By contrast, using the disclosed system 400, node 101*b* can receive a single copy and distribute that locally cached copy to both node 101*c* and 101*d*.

This same method can also be used to reduce bandwidth and improve reliability when a path through the network hierarchy is unavailable. For example, a node 101*e* may try to send data to a NOC 102 when both node 101*a* and 101*b* are experiencing a network outage to the NOC 102. The disclosed system 400 allows the node 101*e* to send that data for storage at node 101*a*, where there is a higher assurance of sending the data to the NOC 102 when connectivity is restored. Allowing nodes 101 to use a "store and forward" method saves bandwidth by reducing the number of times the data is retransmitted within the DIL networks while also improving reliability of sending the data only once.

FIG. 9 is a block diagram illustrating a dynamic quality of service module 900 according to an exemplary embodiment.

Because the QoS 300 at each node 101 needs to be consistent across the entire network architecture 100 (to avoid asymmetric behavior in the network causing failures and outages), network operators rarely change the QoS 300 once it is implemented in the network routers 244. Depending on the current mission and/or phase of war, however, a node 101 may wish to prioritize different network traffic. For example, in a DoD network, if a battalion is advancing, the battalion may wish to prioritize multimedia streaming data 387 (e.g., drone video feeds) and real-time interactive data (e.g., location/mission data).

Accordingly, the embodiment of FIG. 9 includes a dynamic quality of service module 900 that dynamically selects prioritization settings 750 based on the current mission and/or phase of war. As shown in FIG. 3, the user devices 210 include a scheduling tool 320, which enables users to schedule missions and view the current and scheduled mission and phase of war. Meanwhile, as shown in FIG. 9, the dynamic quality of service module 900 includes a mission-specific QoS table 920, which stores prioritization settings 750 associated with each of a plurality of missions and/or phases of war 940. In response to the current mission and/or phase of war 940 specified by the scheduling tool 320, the dynamic QoS module 900 selects the prioritization settings 750 from the mission-specific QoS table 920 associated that the mission and/or phase of war 940.

Additionally, the availability, quality, and preferability of wide area networks 260 may vary in ways that are predictable in view of scheduled missions and/or phases of war 940. Therefore, depending on the current mission or phase of war 940, certain wide area networks 260 may be available and/or preferred (while others may be less desirable and/or unavailable). For instance, when a mission/phase 940 is not active, there may be a desire to prioritize bulk network operations data 359 through microwave transmission 286 and reserve tropospheric scatter communications 276 for status data 351 and state data 353 to support upcoming missions and troubleshooting. Bulk network operations data 359 may include data that requires high bandwidth but is not time sensitive (e.g., Windows software updates), which are well served by microwave transmission 286 that has high bandwidth but low reliability (e.g., interference and weather/rain fade dependent) and availability (e.g., affected by wind). Meanwhile, tropospheric scatter 276, which provides lower bandwidth but has higher availability, may be better suited to time critical and mission essential data types like status data 351 and state data 353. Alternatively, when a mission/phase 940 is active, there may be a desire delay transmission of certain types of data (e.g., prioritize bulk network operations data 359) until a later time or until after the mission/phase 940 so that bandwidth can be allocated to other types of data that are time critical and/or mission essential.

Using current systems, however, nodes 101 indiscriminately utilize whichever wide area networks 260 are prioritized and available, regardless of mission or phase of war 940. For example, microwave transmission 286 may be prioritized, meaning all traffic goes through microwave transmission 286 and all the other transmission systems 349 for all of the other available wide area networks 260 are kept on standby to provide backup in case the microwave transmission 286 network becomes unavailable goes down. Therefore, in existing systems, a lot of available bandwidth goes unused (that network owners still have to pay for) and abrupt disruptions are created when switching.

Accordingly, in some embodiments, the dynamic quality of service module 800 also stores one or more preferred wide area networks 260 associated with each of the plurality of missions or phases of war 940. In those embodiments, in response to the current mission and/or phase of war 940 specified by the scheduling tool 320, the dynamic QoS module 900 selects the preferred WAN(s) 260 from the mission-specific QoS table 920 associated that the mission and/or phase of war 940 and outputs instructions for the application-specific routing module 800 to use the preferred WAN(s) 260 as described above.

In some embodiments, the application-specific routing module 800 may select one of the wide area networks 260 (or store the application data 330 in local storage 880) based on both the user application 310 or type of network operations data 350 (as described above with reference to FIG. 8A) and the current mission or phase of war 940 (as described with reference to FIG. 9). For instance, if an active mission 940 requires dedicated bandwidth (e.g., feeds from an unmanned aerial vehicle), the prioritization settings 750 may deprioritize log data 355 to free up additional bandwidth for the unmanned aerial vehicle feed. The bandwidth for log data 355 may even be limited to zero, causing the log data 355 to be queued in the network operations data buffer 580 (and, in some instances, dropped) as described above. When the mission 940 is over, the bandwidth for log data 355 may be increased either by a network operator via the graphical user interface 590 or as specified by the prioritization settings 750 associated with the next scheduled mission or phase 940.

Referring back to FIG. 1, in some embodiments the disclosed system may also find the best path for transmitting data to other nodes 101 and/or network operations centers 102. For example, a grandchild node 111 at node 101*e* may ordinarily report to the child node 112 at node 101*d*, which reports to the parent node 113 at node 101*b*. However, as mentioned above, nodes 101 (particularly in a DoD network) may shut off (e.g., for weeks at a time), preventing node 101*e* from communicating with node 101*b* via node 101*d*. By monitoring the availability of each node 101, the disclosed system 400 enables each node 101 to route around unavailable nodes 101 and find the best path to communicate with each of the available nodes 101 and/or network operations centers 102. (Returning to the example above, for instance, node 101*e* may communicate with node 101*b* via node 101*c*.) To communicate with another node 101 or network operations center 102, for example, each node 101 may store data indicative of the network hierarchy (e.g., a tree diagram that includes each node 101, a map showing the locations of each node 101, etc.) and use a process (e.g., Dijkstra's algorithm) to find the shortest path to the recipient node 101 or network operations center 102. Meanwhile, the network operations centers 102 may monitor the availability of each node 101—for example, based on the network operations data 350 received (or not received) from each of those nodes 101—and provide that information to each of the other nodes 101 so that each node 101 is dynamically aware of the availability of each of the nodes 101 in the network hierarchy.

Accordingly, if the shortest path from a transmitting node 101 to a receiving node 101 is through an intermediate node that is unavailable, the transmitting node 101 can use the disclosed system to identify a new path that avoids that unavailable node 101. For instance, each node 101 may be configured to find the shortest path (e.g., using Dijkstra's algorithm) from the node 101 to the recipient node in a modified network hierarchy that does not include the unavailable node 101. Alternatively, for each node 101, the network hierarchy data stored at each node 101 may include alternate paths to be used in the event that the node 101 is unavailable. Additionally or alternatively, the disclosed system may provide functionality for an operator to manually identify a path to any node 101 or network operations center 102 in the network hierarchy.

While preferred embodiments have been described above, those skilled in the art who have reviewed the present disclosure will readily appreciate that other embodiments can be realized within the scope of the invention. Accordingly, the present invention should be construed as limited only by any appended claims.

What is claimed is:

1. A bandwidth management system for nodes in communication via disconnected, intermittent, and low bandwidth (DIL) networks, the system comprising:
    non-transitory computer readable storage media;
    a network operations server, at a node, that receives network operations data via a local area network and outputs the network operations data for transmission from the node via one or more wide area networks having an available bandwidth;
    a bandwidth management module that:
    allocates at least some of the available bandwidth to each of a plurality of data types of the network operations data, the plurality of data types comprising at least some of status data, state data, log data, event data, and bulk network operations data; and
    temporarily stores network operations data exceeding the allocated bandwidth for that data type in a data buffer in the non-transitory computer readable storage media; and
    a graphical user interface that provides functionality to:
    control the bandwidth allocated to each of the plurality of data types;
    view the bandwidth used to transmit each of the plurality of data types; and
    view the amount of network operations data stored in the data buffer.

2. The bandwidth management system of claim 1, further comprising:
    a bandwidth mitigation module that:
    provides functionality, via the graphical user interface, to specify prioritization settings identifying at least one higher priority data type and at least one lower priority data type; and
    outputs the network operations data of the higher priority data type for transmission via the one or more wide area networks before outputting the network operations data of the lower priority data type.

3. The bandwidth management system of claim 2, wherein:
    the data buffer that stores the network operations data exceeding the allocated bandwidth for that data type is a mutable queue; and
    the bandwidth mitigation module is configured to drop network operations data from the mutable queue in response to a condition specified in the prioritization settings.

4. The bandwidth management system of claim 3, wherein the condition comprises expiration of a predetermined time period or receipt of updated network operations data.

5. The bandwidth management system of claim 2, further comprising:
    an application specific routing module that:
    stores information specifying one or more preferred wide area networks associated with at least some of the plurality of data types; and
    outputs the network operations data for transmission via the preferred wide area networks associated with each data type.

6. A bandwidth management system for nodes in communication via disconnected, intermittent, and low bandwidth (DIL) networks, the system comprising:
    non-transitory computer readable storage media;
    a network operations server, at a node, that receives network operations data via a local area network and outputs the network operations data for transmission from the node via a plurality of wide area networks having an available bandwidth; and
    an application specific routing module that:
    stores information specifying one or more preferred wide area networks associated with a plurality of data types of the network operations data, the plurality of data types comprising status data, state data, log data, event data, and bulk network operations data; and
    outputs the network operations data for transmission via the preferred wide area networks associated with each data type.

7. The bandwidth management system of claim 6, wherein the network operations server is further configured to receive user application data and output the user application data for transmission via the plurality of wide area networks.

8. The bandwidth management system of claim 7, wherein:
    the user application data is received via an application programming interface (API), enabling the network operations server to identify the data type of the user application data.

9. The bandwidth management system of claim 8, wherein at least some of the network operations data is received via the API.

10. The bandwidth management system of claim 7, wherein:
    the network operations data or the user application data is transmitted from the node according to a quality of service;
    the network operations data or the user application data received by the network operations server is marked with initial quality of service values; and
    the application specific routing module:
    stores an updated quality of service value associated with at least some of the plurality of data types; and marks at least some of the network operations data or the user application data with the updated quality of service value.

11. The bandwidth management system of claim 10, wherein the application specific routing module:
receives the bulk network operations data via a wide area network;
stores the bulk network operations data in the non-transitory computer readable storage media; and
distributes a copy of the bulk network operations data to each of a plurality of user devices via the local area network.

12. The bandwidth management system of claim 10, wherein the node is among a plurality of nodes within a network hierarchy.

13. The bandwidth management system of claim 12, wherein the network operations server at a transmitting node:
stores data indicative of the network hierarchy;
receives information indicative of the availability of each node in the network hierarchy; and
in response to a determination that the shortest path from the transmitting node to a destination node is through an intermediate node that is unavailable, identifies a new path from the node to the destination node that avoids the unavailable intermediate node.

14. The bandwidth management system of claim 12, wherein the network operations server at an intermediate node along a path between a transmitting node and a destination node is configured to:
receive data from the transmitting node and forward the received data to the destination node; and
in response to a determination that a path to the destination node is unavailable, store the received data and forward the received data when the path to the destination node is available.

15. The bandwidth management system of claim 10, further comprising:
a dynamic quality of service module that:
stores prioritization settings and one or more preferred wide area networks associated with each of a plurality of missions;
receives information indicating a current mission; and
outputs the prioritization settings associated with the current mission to the bandwidth mitigation module; and
outputs instructions to the application specific routing module to output the network operations data or the user application data via the preferred wide area networks associated with the current mission.

16. A method for managing bandwidth usage by nodes in communication via disconnected, intermittent, and low bandwidth (DIL) networks, the method comprising:
receiving network operations data via a local area network, by a network operations server at a node, for transmission from the node via one or more wide area networks having an available bandwidth;
providing functionality, via a graphical user interface, to allocate at least some of the available bandwidth to each of a plurality of data types of the network operations data, the plurality of data types comprising at least some of status data, state data, log data, event data, and bulk network operations data; and
temporarily storing the network operations data exceeding the allocated bandwidth for that data type in a data buffer in non-transitory computer readable storage media.

17. The method of claim 16, wherein the data buffer that stores the network operations data exceeding the allocated bandwidth for that data type is a mutable queue, the method further comprising:
providing functionality, via the graphical user interface, to specify prioritization settings identifying at least one higher priority data type and at least one lower priority data type;
outputting the network operations data of the higher priority data type for transmission via the one or more wide area networks before outputting the network operations data of the lower priority data type; and
dropping network operations data from the mutable queue in response to a condition specified in the prioritization settings, the condition comprising expiration of a predetermined time period or receipt of updated data.

18. The method of claim 17, further comprising:
storing information specifying one or more preferred wide area networks associated with at least some of the plurality of data types; and
outputting the network operations data for transmission via the preferred wide area networks associated with each data type.

19. The method of claim 18, wherein the network operations data is transmitted from the node according to a quality of service, the network operations data received by the network operations server is marked with initial quality of service values, and the method further comprises:
storing an updated quality of service value associated with at least some of the plurality of data types; and
marking the network operations data with the updated quality of service value.

20. The method of claim 19, further comprising:
storing prioritization settings and one or more preferred wide area networks associated with each of a plurality of missions;
receiving information indicating a current mission;
prioritizing the network operations data according to the prioritization settings associated with the current mission; and
outputting the network operations data via the preferred wide area networks associated with the current mission.

* * * * *